S. C. PYLES.
BAG-HOLDER.

No. 179,343. Patented June 27, 1876.

Witnesses
Theo. A. Watterson
G. Whiting

Inventor
Samuel C. Pyles,
By Connolly Brooks & McTighe
Attorneys

UNITED STATES PATENT OFFICE.

SAMUEL C. PYLES, OF BURGETTSTOWN, PENNSYLVANIA.

IMPROVEMENT IN BAG-HOLDERS.

Specification forming part of Letters Patent No. 179,343, dated June 27, 1876; application filed May 29, 1876.

*To all whom it may concern:*

Be it known that I, SAMUEL C. PYLES, of Burgettstown, in the county of Washington and State of Pennsylvania, have invented certain new and useful Improvements in Bag-Holders; and I do hereby declare the following to be a full, clear, and exact description of the invention, such as will enable others skilled in the art to which it pertains to make and use it, reference being had to the accompanying drawings, which form part of this specification, in which—

Figure 1:
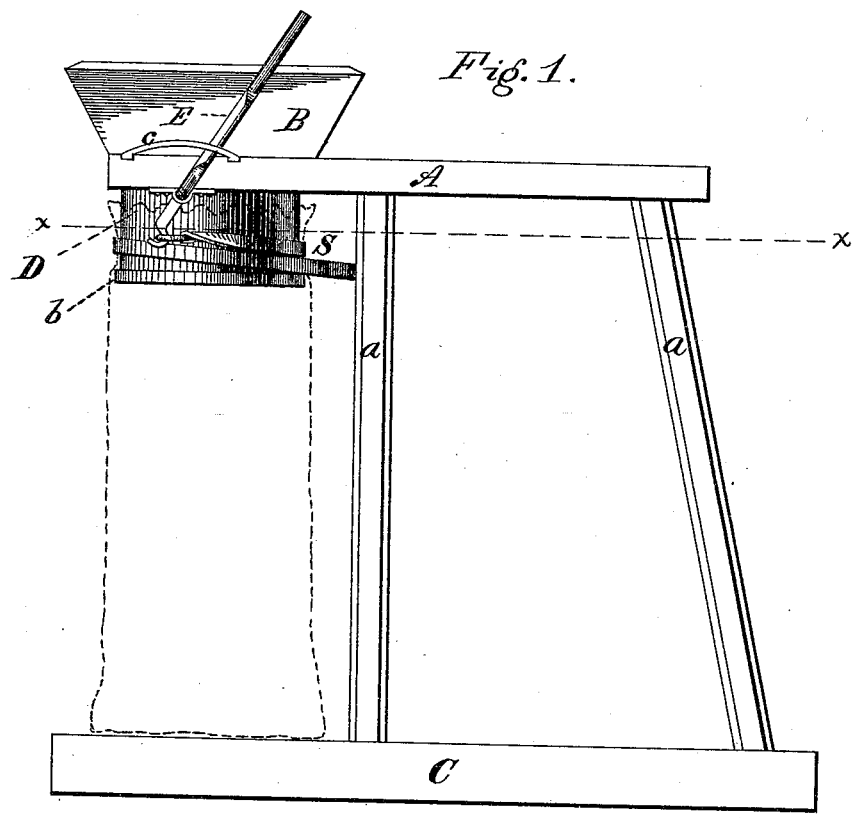
Figure 2:
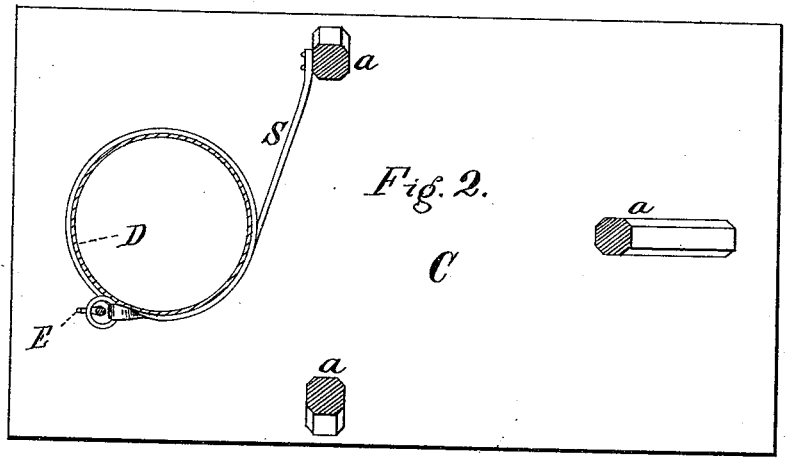

Figure 1 is a side elevation. Fig. 2 is a horizontal section on line $x\ x$ of Fig. 1.

This invention relates to bag-holders; and consists in the use of a flexible strap, fixed at one end, and passing around a cylindrical chute, beaded outside at its lower end to prevent the bag slipping off, and in the means provided for tightening and loosening the strap.

Referring to the accompanying drawings, A designates a table, provided with a hopper, B, and supported on standards $a$ on the base C. Inside the hopper the table is cut through, and a cylindrical chute, D, passes down below the table. The chute D has a bead, $b$, constructed on its lower end outside. Pivoted to a bearing on the table is a lever, E, working inside a rack-segment, $c$, and having its lower end hooked, as shown. Attached to one of the standards $a$ is a long flexible strap, S, long enough to pass at least once around the chute D. It is provided at the opposite end with a ring or hook, or other device capable of attachment to the hooked lever E.

The device operates as follows: The open end of the bag is slipped up on the chute first, and then the strap or cord S is passed around above the bead $b$ on the chute, and hooked onto the lever E. The latter is then drawn like a brake-lever till the strap is tight and firmly embraces the bag. At this point the lever is allowed to drop into the nearest notch in the segment $c$, and the bag is secured, and may be readily filled through the hopper and chute. The latter being closed all around, no grain or other material can escape.

It takes but an instant to adjust or remove a bag, and the device cannot get out of order. It forms a cheap and ever-ready help to those handling material in bags. It does not matter what size the bag may be, so long as it will slip over the bead on the chute. If too large, it can be crimped or lapped on itself.

What I claim is as follows:

1. The flexible strap or cord S, one end fixed to the frame $a$, and the other passed around the chute and provided with suitable means of attachment to a lever, substantially as described.

2. The combination of a strap, S, and a beaded chute, D, substantially as described.

3. The combination of rack $c$, hooked lever E, flexible strap S, and beaded chute D, arranged and operating substantially as described.

In testimony that I claim the foregoing I have hereunto set my hand this 24th day of May, 1876,

SAMUEL C. PYLES.

Witnesses:
SAMUEL W. RIDDLE,
SAMUEL P. RIDDILE.